Jan. 8, 1952            L. B. KUHN            2,581,920
RUBBER TO METAL ADHESIVE COMPRISING DICHLOROBUTADIENE RESIN
AND A CHLORINATED ELASTOMER AND USE THEREOF
Filed March 21, 1947            2 SHEETS—SHEET 1

ELASTOMERIC SUPERSTRATE
    Natural Rubber
    Butadiene Styrene Copolymer
    Butadiene Acrylonitrile Copolymer
    Polychloroprene
    Lactoprene
    Polyisoprene
    Butyl Rubber
    Polybutadiene ADHESIVE LAYER
Dichlorobutadiene Resin
Plus
Chlorinated Elastomer

Fig-1

METALLIC     SUBSTRATE
    Cast Iron      Copper
    Wrought Iron      Lead
    Ingot Iron      Monel
    Steel      Nickel
    Stainless Steel      Zinc
    Aluminum      Galvanized Metal
    Duralumin      Brass
    Magnesium      Bronze INVENTOR.
Leroy B Kuhn
BY
Attys

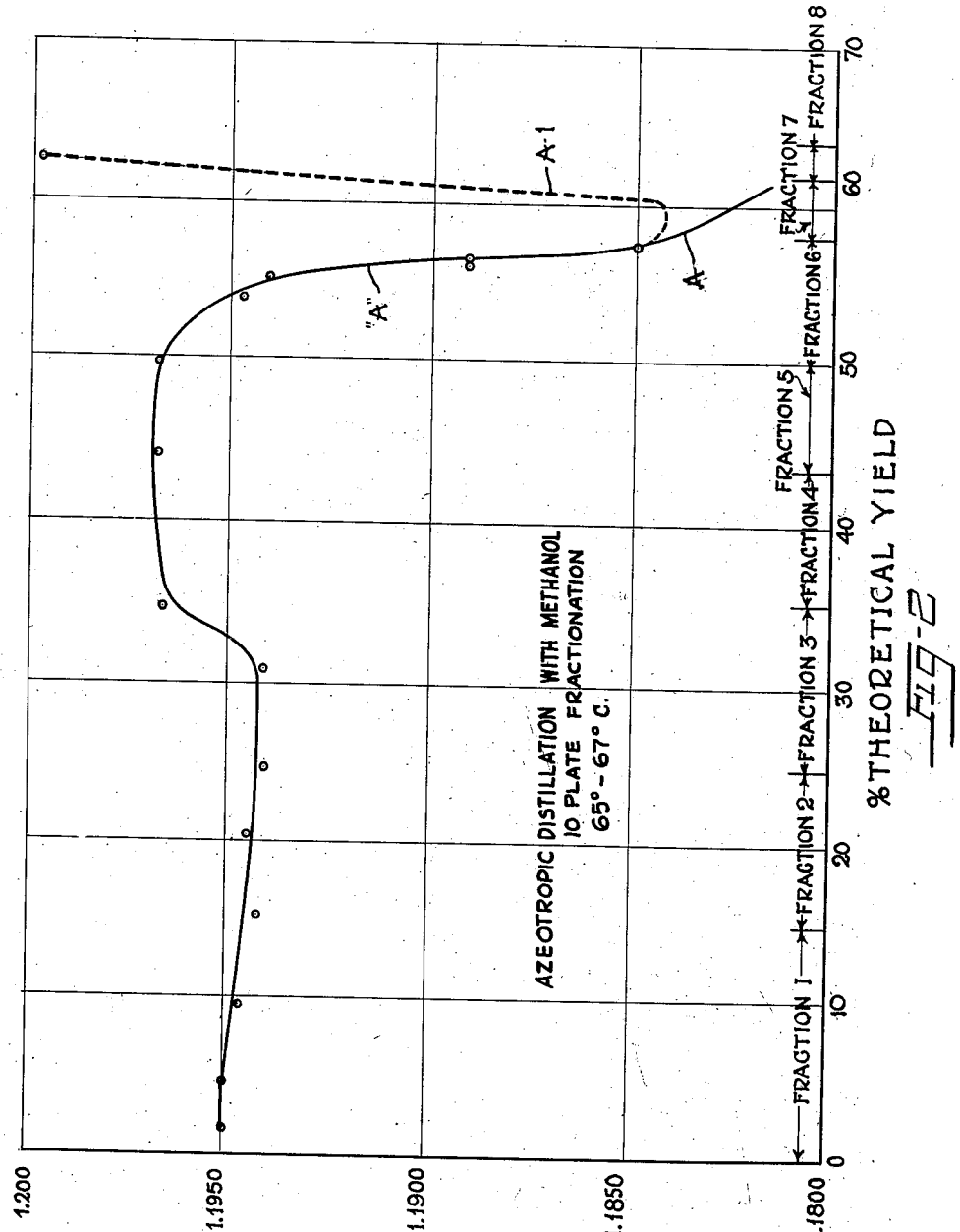

Patented Jan. 8, 1952

2,581,920

UNITED STATES PATENT OFFICE 2,581,920

RUBBER TO METAL ADHESIVE COMPRISING DICHLOROBUTADIENE RESIN AND A CHLORINATED ELASTOMER AND USE THEREOF

Leroy B. Kuhn, Pottstown, Pa., assignor to The Firestone Tire & Rubber Company, Akron, Ohio, a corporation of Ohio Application March 21, 1947, Serial No. 736,148

15 Claims. (Cl. 154—130)

This invention relates to adhesives, and in some of its more particular aspects, to adhesives for bonding natural and synthetic elastomers to metals. This application is a continuation-in-part of my copending application Ser. No. 541,126, filed June 19, 1944, and now abandoned.

The adhering of rubber and other natural and synthetic elastomers to metallic and other surfaces is a problem of long standing and great technical importance, not heretofore solved to complete satisfaction. Natural rubber can be vulcanized to brass-plated surfaces and will form very strong bonds therewith, however the preparation of the brass-plated surfaces must be carried out with extreme care, and the process is therefore rather expensive. The brass-plate process, moreover, has not been used successfully for bonding the synthetic elastomers to metal except where a tie-layer of natural rubber was interposed between the synthetic rubber and the brass-plated surface; and the bond in such cases is always inferior to the bond obtained with natural rubber alone. Natural rubber, Buna N (a butadiene-acrylonitrile elastic copolymer) and neoprene can be vulcanized to metal surfaces coated with various compounds of chlorinated rubber; however this process has not been successfully applied to any synthetic elastomers other than those named, and in many cases results in a bond which is weaker than that obtained between rubber and brass-plate. Moreover certain precautions must be observed in the practice of this latter process, particularly in the matter of coating the metal with the chlorinated rubber; the chlorinated rubber compound is usually applied to the metal in the form of a solvent solution, and the drying thereof should be carried out under carefully controlled conditions of temperature and humidity, since any considerable departure from these conditions will detract from the strength and reliability of the final bond. Another disadvantage of the chlorinated rubber cements heretofore prepared is the fact that at least two different formulations must be provided to take care of the various elastomers on the market; this leads to considerable difficulty in control and processing.

Accordingly, it is an object of this invention to bond natural and synthetic elastomers to metallic and other surfaces.

Another object is to provide a bond between the natural and synthetic elastomers and metallic surfaces which will be equal or superior in strength to bonds obtained by vulcanizing natural rubber to brass-plated surfaces.

A further object is to eliminate the expensive brass-plating step used in bonding natural rubber to metals.

A further object is to provide a process for bonding natural and synthetic elastomers to metals which will give consistent and reliable results without the exercise of extreme precautions.

A still further object is to provide a process for bonding natural and synthetic elastomers to metallic and other substrates which will require the use only of domestically produced, and reliably and cheaply procurable, materials.

A still further object is to provide unitary adhesive formulations capable of adhering a wide range of elastomeric materials to an equally wide variety of different metallic and other substrates. This feature permits a manufacturing establishment to standardize upon a single adhesive material, thus reducing the storage and handling facilities required; eliminating the necessity for identifying and segregating adhesive-coated substrates prior to assembly; and greatly simplifying control and discipline in the manufacture of adhered assemblies.

In commercial production, it is usually most convenient to hot-vulcanize elastomeric materials to the desired substrates. Since the resultant assemblies are ejected from the vulcanizing press at high temperatures, it is a still further object of this invention to provide adhesives which will develop an early and high degree of hot strength.

The invention will be described in connection with the accompanying drawings, wherein:

Fig. 1 is a sectional view of an elastomer-to-metal adhered assembly according to this invention, and Fig. 2 is a graph showing the densities of the various distillation fractions obtained in the manufacture of 2,3-dichlorobutadiene-1,3.

In the specification to follow, the term "dichlorobutadiene" will be used exclusively to denote the compound 2,3-dichlorobutadiene-1,3. The several isomers of this compound will be designated by their respective full chemical names, e. g. 1,2-dichlorobutadiene-1,3.

SYNOPSIS OF THE INVENTION

It has been discovered by this invention that polymers of dichlorobutadiene, and particularly copolymers thereof with minor proportions of certain other unsaturated compounds, are capable of forming adhesive bonds with a wide variety of substances, including substantially any of the natural or synthetic elastomers. Of particular technical importance, it has further been found that blends of dichlorobutadiene polymers with certain chlorinated resins can be made to form exceptionally strong bonds between elastomers and metallic surfaces, such bonds being as strong as, or stronger than, bonds of natural rubber to brass-plated surfaces. In the practice of this invention, the polymeric or copolymeric dichlorobutadiene (or blend thereof with a chlorine-containing resin) is interposed between the surfaces to be adhered, and the assembly is subjected to heat, whereby an extremely strong adhesive bond is formed. The interposition of the adhesive compositions of this invention can be effected in various ways, conveniently, for instance, by coating one of the surfaces to be adhered with a volatile solvent solution of the adhesive composition.

MONOMERIC MATERIALS ENTERING INTO THE DI-CHLOROBUTADIENE POLYMERS AND COPOLYMERS

As noted above, the resins forming the basic constituents of the adhesive compositions of this invention may be polymers of pure dichlorobutadiene, or copolymers thereof with minor proportions (say up to 40%, based on the total weight of dichlorobutadiene and copolymerized material) of other unsaturated compounds copolymerizable therewith. For instance, various unsaturated compounds, believed possibly to include 1,2-dichlorobutadiene-1,3, are associated with dichlorobutadiene as commonly manufactured by caustic or pyrolytic demuriation (dehydrochlorination) of 1,2,3,4-tetrachlorobutane or of 1,2,3-trichlorobutene-3. Certain of these unsaturated compounds, particularly 1,2-dichlorobutadiene-1,3, may very advantageously be permitted to remain with the dichlorobutadiene, and to copolymerize therewith in the production of the basic resin. Adhesives containing the resultant copolymers are characterized by improved "hot pull," i. e., the adhesion in vulcanized assemblies embodying these materials is quite strong at the time of ejection from the hot vulcanizing press. Likewise, the adhesion of the components of the finished assembly in use at ordinary temperatures is materially enhanced. The improved performance is apparently due to a certain degree of curability introduced by the copolymerized material, whereby the resin becomes converted to an infusible state during the vulcanization. The desirable, as distinguished from the undesirable, comonomers associated with dichlorobutadiene may be characterized as being those substances contained in crude dichlorobutadiene which distil over in fractions 1-6 as indicated in Fig. 2 and more particularly described in Example I hereinafter.

As above noted, it is believed possible that 1,2-dichlorobutadiene-1,3 forms a part of the desirable comonomers occurring in crude dichlorobutadiene, this belief being founded largely on indirect evidence: the copolymer of separately synthesized 1,2-dichlorobutadiene with pure dichlorobutadiene yields the same improved performance as the copolymers of the desirable compounds associated with crude dichlorobutadiene. Also, on theoretical grounds, the 1,2-dichlorobutadiene-1,3 might be expected amongst the selected copolymerizable materials occurring in crude dichlorobutadiene.

More particularly with regard to the antecedents of the dichlorobutadiene employed in the practice of this invention, tetrachlorobutane occurs as two geometric modifications (1) a dl-mixture and (2) a meso compound, one of which (undetermined) is solid at room temperature, and the other of which is a liquid. Contrary to the teachings of the art, these modifications exhibit marked chemical differences: preferably only the solid modification, (still more preferably washed free of any accompanying liquid modification by means of methanol) should be demuriated (dehydrochlorinated) to produce crude dichlorobutadiene for use in this invention, as the resultant crude product contains more of the desirable, and less of the undesirable, comonomers above referred to.

Instead of, or in addition to, the desirable comonomers above discussed, there may be copolymerized with the dichlorobutadiene minor proportions of other unsaturated compounds copolymerizable therewith. In general, the dichlorobutadiene should constitute at least 60% of the total weight of dichlorobutadiene and of all copolymerized materials. The unsaturated compounds which may be copolymerized with the dichlorobutadiene should, if employed to the extent of more than about 2%, be of the non-cross linking variety, i. e., must contain not more than one olefinic unsaturated structure, or if the compound contains a plurality of olefinic unsaturated structures, these must be conjugated or cross-conjugated with each other. Examples of suitable copolymerizable compounds will thus be seen to include vinyl esters such as vinyl chloride, vinyl fluoride, vinyl bromide, vinyl acetate, vinyl propionate, vinyl benzoate, vinyl alkyl sulfones, etc.; vinyl ethers and thioethers such as vinyl ethyl ether, vinyl ethyl sulfide, vinyl $\beta$ chloro-ethyl ether, vinyl higher fatty ethers, vinyl phenyl ether, etc.; vinyl ketones such as vinyl ethyl ketone, vinyl phenyl ketone, etc.; cyclic vinyl compounds such as styrene, a-methyl styrene, nuclearly chlorinated styrenes, vinyl carbazole, etc.; acrylic and substituted acrylic compounds such as methyl acrylate, methyl methacrylate, ethyl chloroacrylate, methacrylonitrile, etc.; vinylidene halides, such as vinylidene chloride, vinylidene bromide, 1 - fluoro - 1 - chloro - ethylene; compounds bearing an active cyclic unsaturated carbon atom such as coumarone, indene, 4-methylene-1,3-dioxolane, etc. Examples of suitable conjugated and cross-conjugated copolymerizable compounds are butadiene, chloroprene, isoprene, 2,3-dimethyl butadiene-1,3, piperylene, divinyl ketone, etc. While such copolymerizable compounds do not impart the same improved properties as do the desirable comonomers ordinarily occurring in crude 2,3-dichlorobutadiene-1,3, they may be desirable in special instances, as for instance to improve the solubility, fluidity, etc. of the adhesive.

MODE OF POLYMERIZATION

Coming now to the preparation of the polymers and copolymers of dichlorobutadiene for use in this invention, as is well known, the conditions of polymerization of any monomers greatly influence the properties of the resultant polymers. This is particularly true of dichlorobutadiene which, under casually chosen conditions, polymerizes to yield hard, infusible, insoluble and refractory masses for which no practical use has heretofore been found. While these infusible polymers may be employed as adhesives in the practice of this invention, for instance by polymerizing the monomeric dichlorobutadiene in situ during the formation of the adhesive bond, it will be preferable to employ specially prepared polymers which, in contradistinction to prior art polymers, have certain properties as follows:

I. The resins should be fusible and, at least at moderately elevated temperatures, soluble in organic solvents to permit application of the adhesives in the form of fluid cements.

II. The resins should be characterized by a slight degree of ability to cure upon heating, whereby they will be rendered insoluble and infusible during the vulcanization process to which they will commonly be subjected. This will permit the adhered articles to be ejected hot from the vulcanizing press, without danger of rupturing the adhesive bond. Likewise, the adhered articles will be far more resistant to attack by solvents.

Before discussing in a general way the methods of obtaining the desired properties in the resins to be used, it may be stated that the resins combining in the optimum balance the properties I and II, have been found to be those prepared by polymerization of dichlorobutadiene under the following concurrent conditions:

1. In solution in non-reacting organic solvents, e. g., toluene, benzene, methanol, ethanol, ether, hexane, etc.

2. The concentration of the dichlorobutadiene should be from about 10% to about 50%, based on the total weight of solvent and of dichlorobutadiene.

3. The temperature should be relatively elevated, on the order of from about 40° to about 100° C.

4. The polymerization mass should preferably, but not necessarily, contain from about 0.1% to about 5.0%, based on the total polymerization mass, of a peroxidic catalyst such as benzoyl peroxide.

Other, less preferred means for directing the polymerization, or for altering the polymers to obtain the requisite solubility are:

1. A restrained chlorination of a refractory dichlorobutadiene polymer of the prior art, the chlorine uptake being strictly confined to the range 2–10%, and preferably 3–5%, based on the weight of polymer. This degree of chlorination appears not to alter the essential polymeric chain, but merely breaks up cross-links, side structures, hyper-polymerized nuclei, etc.

2. The use of "modifying agents," as the term is understood in the synthetic rubber art to include certain polymerization-controlling and -directing substances such as lauryl mercaptan, butyl mercaptan, thiophenols, hexamethylene dimercaptan, diisopropyl xanthogen disulfide, etc. The inclusion of from 0.5% to 3% of these materials, based on the weight of monomers, in the polymerization mass, will admirably solubilize the polymers. Polymerization may be carried out in mass, solution, suspension or emulsion.

3. The inclusion of inhibitors such as para cresol in the polymerization mass, preferably in conjunction with the other techniques outlined above.

An interesting sidelight, of academic interest so far as concerns the instant invention, is the fact that the application of the above techniques, in sufficient degree, results in resins which have crystalline properties and may be oriented and otherwise worked in the same manner as the vinylidene chloride and nylon resins. It is probable that the same factors which render the dichlorobutadiene resins sufficiently soluble for use in the preferred forms of this invention also, when carried to a sufficient degree, produce crystallinity: it is surmised, without absolute commitment to this theory, that the casually-produced resins of the prior art were extensively cross-linked. Removal or prevention of this condition would theoretically both increase solubility and, if carried to a sufficient degree, permit the resin to assert any of its latent but suppressed crystalline properties.

USE OF SUPPLEMENTARY RESINS WITH DICHLOROBUTADIENE RESINS

As hereinabove noted, it is desirable, in those cases where elastomers are to be bonded to metallic surfaces, that the adhesive compositions of this invention contain a chlorinated resin in addition to the dichlorobutadiene polymer. Suitable resins for this purpose include in general the well-known chlorinated and hydrochlorinated derivatives of synthetic and natural elastomers, especially satisfactory substances for this purpose being chlorinated natural rubber and chlorinated polybutadiene. However, chlorinated and hydrochlorinated derivatives of other elastomers such as balata, gutta percha, Chilte gum, the Bunas, polyisobutylene, etc. may likewise be used. Likewise various intermediate-type products produced by successive chlorination and hydrochlorination of these elastomers may similarly be employed. Chlorinated neoprene is another resin suitable for this purpose. Hydrochlorinated neoprene would probably also be suitable, but this product can not be made by ordinary methods. Other suitable chlorinated resins are exemplified in chlorinated polyvinyl chloride and chlorinated polyvinylidene chloride. All of these resins are operative for the purpose of enhancing the adhesion to metal of the compositions of this invention, and are generically termed "chlorinated resins" in this specification. In general, between about 10% and about 90% of a chlorinated resin, based on the total weight of resin and polydichlorobutadiene, should be employed in the adhesive compositions of this invention, when designed for use in adhering elastomers to metals.

The chlorinated resins need not be directly incorporated with the dichlorobutadiene adhesives of this invention; for instance, the chlorinated resin may be suitably coated upon the metallic surface, and the dichlorobutadiene adhesive superimposed upon the chlorinated resin coat. An elastomer cured in contact with the composite coating will establish a firm bond with the metal.

As brought out above, the chlorine-containing resins are of particular advantage in increasing the adhesion of elastomers to metallic surfaces. The resins have also the function of developing advantageous application properties and initial tack in the compositions of this invention, which last functions can obviously be fulfilled by resins other than the chlorinated resins set forth above. Accordingly, when metallic surfaces are not involved, the application and tack properties of the adhesive compositions can be improved by the addition of materials other than chlorinated resins, such other materials being exemplified in vinyl chloride and vinyl chloride-acetate copolymers, the various natural and synthetic elastomers, polyvinyl butyral, phenol-formaldehyde resins and the like.

Cement Formulation

The adhesive compositions of this invention are very conveniently prepared and applied in the form of a solvent solution or "cement" containing the polydichlorobutadiene and, in the case where the adhesive is to be used for bonding elastomers to metals, the chlorine-containing resin. A wide variety of solvents may be used in preparation of cements according to this invention, suitable solvents, roughly in decreasing order of preference, being exemplified in carbon tetrachloride, trichloroethylene, orthodichlorobenzene, chlorobenzene, benzene, toluene, xylene, ethylene dichloride, hexane, cyclohexane, acetone, methyl ethyl ketone, ethyl acetate, and the like. Likewise, especially in those cases where elastomers are to be adhered together, monomeric dichlorobutadiene may be incorporated in greater or less proportion in the cement, and will serve as a solvent; in such cases any monomer still present in the adhesive will polymerize during the curing step to provide part or all of the polymer requisite to the bond. The amount of solvent used will be adjusted to secure the desired application properties in the cement; in usual practice, cements containing from about 20% to about 95% of solvent will have convenient properties for application by brushing, spraying, dipping and the like. As will be brought out in detail immediately hereinafter, it may often be advantageous to apply the cements in heated condition, in which case less quantities of solvent will be required. The compositions may also be applied to the surfaces to be adhered in the form of an aqueous emulsion or latex, in the form of an unsupported film, or in the form of a paper web or metallic foil coated with the composition.

Cements containing polydichlorobutadiene have a tendency to form gel-like structures when allowed to stand. These structures, hereinafter designated "gel structures" for convenience, are believed to result from a crystallization of the polymer, somewhat analogous to the crystallization of nylon polymers in alcoholic solution, and not to be true gels. At any rate this structure can be prevented or broken up by heating the cement up to a moderately high temperature, usually in the neighborhood of 60° C. Likewise this tendency to gel can be reduced by appropriate selection of mixtures of solvents rather than pure solvents, suitable mixtures being carbon tetrachloride, trichloroethylene and xylene; carbon tetrachloride, o-dichlorobenzene and toluene; and other similar combinations of solvents. The combined solvents seem to slow up, and in some cases to prevent, formation of the undesired gel. However, keeping the adhesive cement at temperatures above 60° C. during application is not particularly inconvenient and has been found to be a most practical procedure.

Further with regard to the gel structure, and consequent necessity for hot application of the adhesive cements, this is not entirely disadvantageous, as any coatings of the hot cement upon articles to be adhered quickly set up upon slight cooling or loss of solvent. This avoids "tear drop" or sagging of the coating. Also, second coatings or "cover cements," when desired, may be applied after only a very short drying period. A still further advantage of hot application is the fact that the coatings become largely set up before dropping down to room temperature or below, thus avoiding condensation of moisture upon the incompletely set adhesive film when atmospheric conditions are humid.

Unless certain precautions are observed, the adhesive cements of this invention will, upon storage or shipment, assume the form of a hard gel which is difficult to break up for use. This can easily be avoided by preparing the adhesive solution hot (say above 60° C.) so that the mass is completely dissolved, and then cooling with vigorous agitation. The gel so formed assumes a permanently flowable consistency which may readily be stirred, blended, removed from the container, etc., as required.

In a preferred practice of this invention, the polymer of dichlorobutadiene is separately prepared and thereafter incorporated into the adhesive composition. Alternatively to this, the dichlorobutadiene monomer may be incorporated with other ingredients of the adhesive composition, and the mixture subjected to conditions such as to bring about a greater or less degree of polymerization. When such polymerization take place in organic solvent solution in the presence of any of the chlorinated resins as hereinabove defined, it will be found that the course of polymerization is directed to the production of highly crystalline polymers, which, as noted hereinabove, are of special advantage in the adhesives of this invention.

A still further variaion involves the retention of a greater or less proportion of the monomeric dichlorobutadiene in the adhesive composition as finally used. Upon curing, the polymer is generated in situ. This practice has advantages in certain situations, particularly when plies of elastomer are to be adhered together; in such cases, the monomer to some extent penetrates, and polymerizes in, the elastomer, thus providing a less abrupt adhesive interface and a stronger bond.

Application of the Adhesives

In those cases where the elastomers are to be bonded to metallic substrates, the metallic "faying" surfaces, i. e., the metallic surfaces which are to be adhesively bonded to the elastomer, are preferably cleaned free of any rust or corrosion by sand-blasting, wire brushing, etc., and then solvent degreased. No more elaborate cleaning or conditioning is necessary. The cement compositions of this invention (preferably in heated, fully dissolved state) are applied by brushing, spraying, dipping or other appropriate means to the metallic faying surfaces, and then dried. No special precautions (such as adjustment of air circulation, humidity or temperature) need be taken during this drying step, in contrast to the usual elastomer-chlorinated rubber-metal bonding processes. The coated metallic substrate may be immediately assembled and vulcanized with the elastomer, or may be stored for future assembly as required.

In those cases where the coated metallic members are to be stored for some time, particularly when the storage is under uncleanly conditions, there should be applied over the adhesive cement of this invention a cover cement of an elastomeric stock which may either be identical with, or at least adherable to, the stock with which the metallic member is ultimately to be assembled. Metallic inserts coated first with the adhesives of this invention and thereafter with a cement of natural rubber or Buna S type elastomer will have a sufficient affinity for most elastomeric stocks to be readily vulcanizable thereto, so that a single standard cover cement may be used throughout any industrial establishment employing the adhesives of this invention. In addition to protecting the coated metallic members from contamination, the cover cement provides "building tack" which simplifies assembly operations. The cover cement may also contain additional agents adopted to improve or modify the bond: for instance, the synthetic elastomers generally contain small proportions of amine-type antioxidants which accelerate the hardening of the adhesive during the vulcanizing step. Certain stocks, such as natural rubber stocks, may be deficient in these materials, which deficiency may be made up by incorporation of a suitable amine, such as phenyl-β-naphthylamine, into the cover cement. The amount employed should be roughly the amount usually incorporated with synthetic elastomers, e. g., 0.5%–2.0%. It is to be understood that the use of a cover cement is principally for the purpose of keeping the elastomer-adhesive interface clean under difficult conditions. If a cover cement is not used, and the adhesive on the faying surfaces of the metallic inserts or of the elastomers become soiled, they may be cleaned satisfactorily for adhesion by wiping with a cloth soaked in methanol or like solvent which will remove soil without leaching out the chlorinated rubber.

ASSEMBLY AND VULCANIZATION

The elastomer and adhesive-coated substrate are vulcanized together in any suitable apparatus arranged to hold the components in assembled relation while they are heated to vulcanization temperatures. The schedule of vulcanization time, pressure, temperature, etc. will be determined by the elastomer stock in the assembly, i. e., any conditions vigorous enough to effect vulcanization of any customary elastomer will suffice to insure effect mutual wetting of the adhesive and elastomer and to cure the adhesive.

The foregoing discussion has been largely on the basis that the adhesives of this invention will be applied as solvent cements, and will be employed to adhere elastomeric materials to metallic substrates. However, the adhesives of this invention may likewise be employed for the adhesion of a wide variety of these and other types of materials, examples being:

Metals—
Cast iron
Wrought iron
Ingot iron
Steels
Stainless steels
Aluminum
Duralumin
Magnesium
Copper
Lead
Monel metal
Nickel
Zinc
Galvanized metals
Brasses
Bronzes Elastomers—
Natural rubber
Butadiene-styrene copolymers
Butadiene-acrylonitrile copolymers
Neoprene
Lactoprene
Polyisoprene
Butyl rubber
Polybutadiene Plastics—
Phenolic resins and laminates
Urea-formaldehyde resins and laminates
Vinyl resins
Nylon
Saran
Cellulose esters, ethers, nitrates Miscellaneous—
Porcelain
Glass
Alumina
Wood
Paper
Cotton
Rayon Likewise the adhesive may be applied otherwise than as a cement, for instance as a dry film containing the dichlorobutadiene resin and any other ingredients which it may be desirable to incorporate therewith. The adhesive may be applied to the faying surfaces of either or both of the components to be adhered together, as convenience may dictate.

SPECIAL SOLVENT-RESISTANCE TECHNIQUES

In certain cases it may be found desirable to incorporate certain of the well known "petronizing" agents in the adhesive compositions of this invention, so as to promote insolubilization of the chlorinated rubber. Later practice of this invention has indicated that the curing of a dichlorobutadiene resin possessed of curing properties as above described will have the same effect, so that the use of petronizing agents will not often be required. However, in the event that the use of petronizing agents is found desirable, the following matters should be borne in mind.

Most petronizing agents heretofore employed would cause setting up of the chlorinated resins if the cements of this invention were heated as above described, in order to prevent or break up the "gel" structure. In this case, therefore, one of four techniques must be observed; (a) the cement must be made up predominantly from monomeric dichlorobutadiene, in which case heating to avoid gel formation is unnecessary; (b) addition of the petronizing agent or chlorinated resin must be withheld until just before the use of the adhesive; (c) the cement must be so adjusted that gelling can be broken up at relatively low temperatures, and special "petronizing" agents must be used which are unreactive at these relatively low temperatures; or (d) a cement containing only the chlorinated resin and petronizing agent is coated upon the metal, and a separate layer of polydichlorobutadiene is coated on top of the chlorinated resin layer.

Referring to technique (a), this involves dissolving the monomeric dichlorobutadiene, chlorinated resin and petronizing agent together to form a cement. Solvent in addition to the monomer may be used, but in many cases will be unnecessary. The monomer polymerizes spontaneously, and accordingly the composition must contain a suitable inhibitor to prevent premature polymerization, and consequent gelling, of the cement; however, the inhibitor must not prevent polymerization at curing temperatures. Para cresol has been found to be highly suitable for this purpose, and is effective in concentrations of about 0.25% and over, based on the weight of monomer. The cement composition is applied to the surfaces to be bonded, and the assembly cured in the usual manner.

Referring to technique (b), the formation of "gel" in solutions of polydichlorobutadiene requires an appreciable period, roughly three or four hours. Accordingly, a fluid cement of polydichlorobutadiene and chlorine-containing resin is prepared (as by polymerizing the liquid monomer in solution, or breaking up a gelled polymer solution by heating and then cooling), the "petronizing" agent is added, and the cement is used promptly, before gelling can occur.

Referring to technique (c), as noted above, special combinations of solvents will lower the breaking temperature of polydichlorobutadiene gel structures. By this means the temperature at which the gel structure can be broken up and prevented may be lowered from the usual temperatures in the neighborhood of 60° C. down to about 30° C. The otherwise less preferable polymers of unenhanced crystalline properties likewise have less tendency to gel, and accordingly their use in cements of this type is indicated. In conjunction with these techniques, there should be used a petronizing agent which will not cause insolubilization of the chlorinated resin at the relatively low temperatures required for gel inhibition. Thiourea is a preferred petronizing agent for this purpose; however, there may be employed any other petronizing agents which are relatively insoluble in the adhesive compositions at low temperatures, but become partially soluble at curing temperatures. Examples of other petronizing agents equivalent to thiourea include di-o-tolylthiourea, hexamethylenetetramine, diphenylguanidine, di-o-tolylguanidine, 2-mercaptobenzothiazole and zinc butylxanthate.

Referring to technique (d), the chlorinated resin and petronizing agent are made up as a separate primer coat cement, which does not require heat to prevent gelling, so that no problem of premature petronization is introduced. The polydichlorobutadiene is made up as a cover cement containing no chlorinated resin, so that the cement can be heated to prevent gelling, without causing petronization of any chlorinated resin. The metal is coated first with the chlorinated resin-petronizing agent primer cement, and then with the polydichlorobutadiene cover cement. An elastomer cured in contact with the composite coating will establish a very strong bond with the metal.

Characteristics of the Adhesive Bond

The adhesive bonds of this invention are sharply distinguished from comparable bonds heretofore produced between metals and elastomers in a number of respects:

1. Strength
2. Reliability
3. Depth of bond
4. Flexibility
5. Fatigue resistance
6. Shock resistance
7. Solvent resistance The adhesive bonds of this invention are characterized by a high strength, so that failure of any bonded assembly invariably occurs deep in the elastomer stock rather than the adhesive line. Most prior adhesives tend to fail at or near the adhesive line. Likewise, the adhesives of this invention are consistent in performance, "holidays" (areas of non-adhesion), if any, at the adhesion interface being rare in occurrence, and small in percentage of the area of adhesion in the rare specimens in which they occur. Another characteristic is the tendency of the failure in any assembly to occur deep in the elastomer stock, leaving at least a substantial fraction of an inch of unruptured stock still adhering to the metal substrate; the effect of this on the reliability in service of the bonds will be manifest.

Another feature is the flexibility of the bonding material: this can be demonstrated by repeated bending of a sheet metal substrate to which an elastomer has been bonded in accordance with this invention. When the metal finally ruptures, the adhesion of the elastomer will be found to be continuous right up to the break in the metal. This flexibility contributes greatly to the fatigue and shock resistance of assemblies adhered in accordance with this invention. The adhered structures likewise have excellent solvent and chemical resistance.

With the foregoing general discussion in mind, there are given herewith detailed examples of the practice of this invention. All parts given are by weight.

Example I

A. PREPARATION OF SOLID 1,2,3,4-TETRACHLOROBUTANE

| | |
|---|---|
| Butadiene | 12 lb./hr. (1 mol) |
| Chlorine gas | 34 lb./hr. (2.2 mols) |

For this portion of the process there was provided a vertical 18" x 18" cylindrical steel reactor provided with a cooling coil and having a hooded agitator impeller near the bottom. Two horizontal inlet pipes were provided, discharging under the impeller. Operation was continuous, the reactor being substantially filled with molten tetrachlorobutanes produced during earlier operation, and the chlorine and butadiene being separately introduced through the respective inlet pipes. Temperature was kept at 75° C. by means of the cooling coil, and the incoming reagents were not artifically dried, so that the resultant corrosion of the reactor kept a small amount of ferric chloride present in the system to act as a catalyst favoring the production of the solid modification. As the bulk of the tetrachlorobutane was augmented by the reaction of the chlorine and butadiene, it was drawn off, blown with air to remove hydrogen chloride, and cooled to room temperature. The crystallized solid modification was separated from the liquid by means of a centrifuge with a filter basket, and washed in the basket with methanol. The washed product was used as a technically pure high melting 1,2,3,4-tetrachlorobutane modification intermediate for the manufacture of dichlorobutadiene as will now be described.

B. MANUFACTURE OF DICHLOROBUTADIENE

| | Pounds |
|---|---|
| a. { 1,2,3,4-tetrachlorobutane (high-melting modification prepared as above described) | 230 |
| { Methanol | 285 |
| b. Aqueous caustic soda solution (containing 50% by weight NaOH) | 230 |

The apparatus employed comprised a 75 gallon still pot provided with a heating and cooling jacket and surmounted by a reflux column. This column comprised a tower 4" in diameter and 40" in height, packed with vertically arranged glass fibers ("Fiberglas" Basic fiber No. 800, manufactured by the Owens-Corning Corporation; total weight of fiber in tower, 2 lbs.). The column was provided at the top with a partial condenser, arranged to reflux its condensate to the column, and a final condenser arranged to condense and divert as product the vapors passing through the partial condenser.

The ingredients listed at "A" were charged into the still pot, and the caustic soda solution was fed in over a period of 8 hours. The partial condenser was adjusted to provide a reflux ratio of 1:1 (reflux: total material removed from the column). Under these conditions, it is estimated that the column provided a separation equivalent to 10 theoretical plates. During most of the run, the temperature at the top of the column remained steady at 65° C., the discharged distillate comprising about 50% by weight of dichlorobutadiene. (It will be noted that the relatively low still head temperature indicates the formation of a minimum boiling azeotrope mixture, which contributes greatly to the separation efficiency.) Toward the end of the run, heat was supplied to the still pot, and the temperature of the still head gradually rose to 67° C., at which point the reaction was discontinued. Approximately 1% of p-cresol, based on the weight of product, was introduced into the receiver at the beginning of the run. Just preceding the polymerization as below described, the distillate recovered from the final condenser was mixed with water to effect separation of the dichlorobutadiene from the methanol and dried over calcium chloride. This product, containing a substantial proportion of the p-cresol stabilizer, entered directly into the polymerization, the p-cresol serving to influence the polymerization in the desired direction.

In order to illustrate the effect of unsaturated copolymerizable materials associated with crude dichlorobutadiene, the successive fractions coming over in the distillation just described, freed from methanol, were kept separate until polymerization, and at that time combined in various proportions, as set forth hereinbelow under "Polymerization." The densities of the successive fractions, freed from methanol but not polymerized, were determined and plotted as ordinates in curve "A" of the drawing, the abscissae indicating the total cumulative yield, up to the point of sampling, as percent by weight of the total possible theoretical yield. The notations "Fraction 1," "Fraction 2," etc., and their associated dimension arrows indicate the ranges over which the successive fractions were taken. The effect of washing the 1,2,3,4-tetrachlorobutadiene with alcohol is indicated in the dotted branch "A-1" of curve "A," which branch "A-1" indicates the properties obtained on a run in which the washing was omitted. "Fraction 8" was taken from the run in which the washing was omitted.

C. POLYMERIZATION

| | Parts |
|---|---|
| Dichlorobutadiene (fraction or fractions as indicated in Table I hereinbelow) | 100 |
| Toluene | 230 |
| Benzoyl peroxide | 1 |

A series of polymers was produced in accordance with the foregoing recipe, using as the monomer in each case, a mixture of fractions of dichlorobutadiene and associated impurities produced as above described and combined as indicated in Table I. In each case, the selected monomeric mixture (still containing p-cresol), toluene and benzoyl peroxide were mixed together and maintained at 75° C. for 5 hours, at the end of which time, 93% of the polymerizable material had become polymerized. The resultant polymer solution, containing some monomeric material was then made up into adhesive compositions as follows:

D. FORMULATION

| | | Parts |
|---|---|---|
| a. | Carbon black (non-reinforcing: "Thermax" manufactured by R. T. Vanderbilt) | 100 |
| | Chlorinated rubber (125 cps. type) | 295 |
| | Naphtha ("Hi Flash" manufactured by The Atlantic Refining Company) | 80 |
| b. | Toluene | 1750 |
| c. | Dichlorobutadiene polymer solution (prepared as described above: contains 30% polymer and unconverted monomer) | 333 |

A series of formulations was prepared in accordance with the above recipe, one from each of the polymer solutions prepared as described under "Polymerization." In each case, the carbon black and chlorinated rubber were blended on a roll mill and then dispersed in the naphtha by means of high speed agitation. The resultant solution was heated to 50° C., the polydichlorobutadiene solution, heated to 60° C., added and mixed in, and the mixture cooled to room temperature with continuous agitation. The resultant product was a stable, evenly dispersed gel or cement of flowable consistency. Solutions cooled without agitation set to a stiff gel difficult to handle.

E. TESTING AND APPLICATION

Each of the cements prepared as above described was subjected to a series of tests simulating practical applications, as follows:

Metals Adhered—
| | |
|---|---|
| Cast iron | Copper |
| Wrought iron | Lead |
| Ingot iron | Monel metal |
| Steel | Nickel |
| Stainless steel | Zinc |
| Aluminum | Galvanized steel |
| Duralumin | Brass |
| Magnesium | Bronze |

Elastomers Adhered (all of these stocks contained conventional vulcanizing agents and pigments appropriate to the type of stock indicated)—
  Natural rubber tread stock
  Butadiene-styrene elastomer tread stock
  Butadiene-acrylonitrile elastomer fuel cell liner stock
  Neoprene tubing stock
  Lactoprene gum stock
  Polyisoprene gum stock
  Butyl rubber tire tube stock Each of the adhesive cements formulated as above described was used to adhere samples of each of the listed metals to each of the listed elastomer stocks. The structures of, and tests conducted upon, the adhered samples are detailed hereinbelow. In each case, the metallic surface was sand blasted, solvent degreased, brush-coated with the cement, and dried, with the observance of no special precautions beyond ordinary cleanliness. For application, the cement was rendered fluid by heating to 60° C., brush-coated onto the metal faying surface, and dried at room temperature. The elastomer and coated metallic surface were assembled together and cured in a rubber molding press at a temperature, and for a time appropriate to the elastomer undergoing test, usually 30 minutes at 300° F., for the purpose of curing the elastomer and adhesive and to insure their flow into intimate mutual contact. Highly satisfactory adhesion was obtained in every case. Mechanical details of the adhered structures, and the tests conducted thereon are given herewith.

F. TESTS AND TEST STRUCTURES

1. Structures for hot pull, tensile, etc.:
A strip of the selected elastomer 3″ x 1″ x ½″ was adhered by means of the selected adhesive formulation to a strip of the selected metal, the adhesion being between the 3″ x 1″ faces. Adhesive was omitted from a 1″ square at one end of the juxtaposed surfaces to leave a free flap of elastomer.

2. Percent adhesion test:

The free flap of elastomer on the sample undergoing test was stripped off by pulling in a direction parallel to the 3" dimension of the assembly and away from the end at which adhesive had been omitted. Inasmuch as the failure tended to occur deep in the rubber stock, it was necessary to periodically slice the stock down to the metal. The percent adhesion, i. e., the percentage of the metallic faying surface left covered with elastomer, was recorded. The test was carried out (1) upon samples while still hot immediately after removal from the vulcanizing press, the percent of adhered area being recorded as "hot pull"; (2) upon samples which had cooled to room temperature, the percent adhered area being recorded as "normal"; and upon still other samples which had been subjected to a heat-aging cycle in which the specimens were heated in an oven at 155° C. for one hour followed by 175° C. for a further hour, the pulling of these specimens being performed while they were still hot from the heat test cycle, the results being tabulated under "heat test." Typical formulations and results are set forth herewith in Table I.

SHEAR FATIGUE TESTS

Shear fatigue test specimens were prepared from each of the pairs of metals and elastomers set forth hereinabove. In each case, a sheet of elastomer 1" x 6" x ¼" was adhered to two flat metal plates, one at each 1" x 6" face of the sheet of elastomer, using the general procedure of this example and the preferred adhesive of items 16–25 of Table I. The assembly was fatigue-tested in a machine in which one of the metal plates was held stationary and the other reciprocated parallel to the 6" dimension of the elastomer sheet with a stroke of ¼" and a frequency of 250 cycles per minute. In all cases, the samples withstood over two weeks of the test.

*Example II.—1,2-dichlorobutadiene copolymer*

PREPARATION OF COPOLYMER

| | Parts |
|---|---|
| 2,3-dichlorobutadiene-1,3 | 100, 95, 90, 85 or 75 |
| 1,2-dichlorobutadiene-1,3 (correspondingly) | 0, 5, 10, 15 or 25 |
| Toluene | 233 |
| Benzoyl peroxide | 1 |

Table I

| Composition of monomers, per cent, on basis of polymer weight | | | | | | | | Superstrate | Substrate | Tests, per cent adhesion | | | Item No. |
|---|---|---|---|---|---|---|---|---|---|---|---|---|---|
| Fraction 1 | Fraction 2 | Fraction 3 | Fraction 4 | Fraction 5 | Fraction 6 | Fraction 7 | Fraction 8 | | | Hot pull | Normal | Heat test | |
| 24 | 16 | 16 | 14 | 11 | 13 | 6 | 0 | GR-S¹ | Steel | 30 | 100 | 100 | 1 |
| | | | | | | | | Rubber² | do | 0 | 100 | 100 | 2 |
| | | | | | | | | GR-S | Al | 30 | 100 | 100 | 3 |
| 24 | 15 | 15 | 15 | 11 | 12 | 6 | 2 | GR-S | Steel | 100 | 100 | 80 | 4 |
| | | | | | | | | | Al | 100 | 100 | 80 | 5 |
| | | | | | | | | | Brass | 100 | 100 | 80 | 6 |
| | | | | | | | | | Mg | 100 | 100 | 70 | 7 |
| | | | | | | | | | Dural | 100 | 100 | 80 | 8 |
| | | | | | | | | | Ni | 100 | 100 | 80 | 9 |
| | | | | | | | | | Zn | 100 | 100 | 80 | 10 |
| | | | | | | | | Buna N³ | Steel | 100 | 100 | 80 | 11 |
| | | | | | | | | Neoprene⁴ | do | 100 | 100 | 80 | 12 |
| 0 | 20 | 20 | 18 | 14 | 16 | 8 | 4 | GR-S | do | 100 | 100 | 80 | 13 |
| 0 | 0 | 25 | 23 | 17 | 20 | 10 | 5 | GR-S | do | 20 | 100 | 40 | 14 |
| 25 | 17 | 17 | 15 | 12 | 14 | 0 | 0 | GR-S | do | 100 | 100 | 100 | 15 |
| 0 | 23 | 23 | 20 | 16 | 18 | 0 | 0 | GR-S | do | 100 | 100 | 100 | 16 |
| | | | | | | | | | Al | 100 | 100 | 100 | 17 |
| | | | | | | | | | Brass | 100 | 100 | 100 | 18 |
| | | | | | | | | | Mg | 100 | 100 | 100 | 19 |
| | | | | | | | | | Dural | 100 | 100 | 100 | 20 |
| | | | | | | | | | Ni | 100 | 100 | 100 | 21 |
| | | | | | | | | | Zn | 100 | 100 | 100 | 22 |
| | | | | | | | | Rubber | Steel | 50 | 100 | 100 | 23 |
| | | | | | | | | Neoprene | do | 100 | 100 | 100 | 24 |
| | | | | | | | | Lactoprene⁵ | do | 100 | 100 | 100 | 25 |
| 0 | 21 | 21 | 19 | 15 | 16 | 8 | 0 | GR-S | do | 20 | 100 | 50 | 26 |
| 0 | 50 | 10 | 9 | 7 | 8 | 4 | 2 | GR-S | do | 20 | 100 | 20 | 27 |
| 0 | 0 | 0 | 0 | 0 | 100 | 0 | 0 | GR-S | do | 100 | 80 | 20 | 28 |
| 0 | 0 | 0 | 0 | 100 | 0 | 0 | 0 | GR-S | do | 100 | 75 | 100 | 29 |
| 66 | 0 | 0 | 0 | 0 | 34 | 0 | 0 | GR-S | do | 100 | 100 | 100 | 30 |
| 75 | 0 | 0 | 0 | 0 | 25 | 0 | 0 | GR-S | do | 100 | 85 | 100 | 31 |
| 100 | 0 | 0 | 0 | 0 | 0 | 0 | 0 | GR-S | do | 20 | 85 | 20 | 32 |

¹ A conventional 60 durometer vulcanizable butadiene-styrene elastomer formulation.
² A conventional 40 durometer vulcanizable natural rubber formulation.
³ A conventional vulcanizable butadiene-acrylonitrile elastomer formulation.
⁴ A conventional vulcanizable neoprene formulation.
⁵ A vulcanizable formulation of a copolymer of "Lactoprene EV," an elastomeric copolymer of ethyl acrylate with minor proportions of vinyl chloroethyl ether developed by the U. S. Department of Agriculture.

From an inspection of the table, it will be evident (items Nos. 16–25) that best overall results are obtainable with resins derived from monomers including a small proportion of the later fractions of dichlorobutadiene. Omission of these fractions (item 32) results in somewhat less desirable hot-pull properties. Inclusion of the forerun and of fractions coming after fraction 6 and of the later fractions where methanol washing of the antecedent tetrachlorobutane was not practiced (items Nos. 1, 4, 14) likewise causes departure from optimum results. The adhesive resin of items 16–25 was settled upon as a preferred type.

A series of copolymers was prepared, using the 2,3-dichlorobutadiene-1,3 and 1,2-dichlorobutadiene in the ratios of 100:0, 95:5, 90:10, 85:15 and 75:25 as indicated in the recipe. Polymerization in each case was carried out exactly as described in Example I.

COMPOUNDING

| | Parts |
|---|---|
| Polymer solution (prepared as just described, containing 30% resin) | 333 |
| Chlorinated rubber | 200 or 300 |
| Toluene | 1267 |

A series of cements was prepared in accordance with the above recipe, using each of the five copolymer solutions prepared as described under "Polymerization" with each of the proportions 200 or 300 parts of chlorinated rubber, thus making ten cements in all. Each cement was tested in adhering to steel a 60 durometer GR-S butadiene-styrene elastomer tread stock and a 50 durometer natural rubber tread stock, the tests being conducted as described in Example I. The results are set forth herewith in Table II.

*Table II*

| Percent 1,2-dichlorobutadiene-1,3 in copolymer | Percent adhesion with cements containing— | | | | | | | | | | | |
|---|---|---|---|---|---|---|---|---|---|---|---|---|
| | 11% chlorinated rubber— | | | | | | 16% chlorinated rubber— | | | | | |
| | Adhering GR-S | | | Adhering natural rubber | | | Adhering GR-S | | | Adhering natural rubber | | |
| | Hot pull | Heat test | Normal | Hot pull | Heat test | Normal | Hot pull | Heat test | Normal | Hot pull | Heat test | Normal |
| 0 | 0 | 50 | 40 | 0 | 100 | 98 | 0 | 85 | 40 | 0 | 60 | 50 |
| 5 | 40 | 100 | 70 | 0 | 100 | 100 | 90 | 100 | 95 | 0 | 100 | 100 |
| 10 | 70 | 100 | 95 | 20 | 100 | 100 | 100 | 100 | 100 | 20 | 100 | 100 |
| 15 | 50 | 60 | 55 | 0 | 100 | 100 | 97 | 100 | 97 | 0 | 100 | 100 |
| 25 | 50 | 70 | 50 | 0 | 50 | 50 | 65 | 40 | 60 | 0 | 50 | 75 |

From an inspection of the table, it will be apparent that the copolymers containing about 10% of the comonomer (1,2-dichlorobutadiene-1,3) yield the best all-round results, particularly on hot pull. A slight superiority will also be noted in cements containing 16% chlorinated rubber. The different behavior of the natural rubber will be noted, in that the hot pull improves to a less extent as the cement is adjusted toward the preferred compositions: this is believed to reflect the absence of amine-type stabilizers in natural rubber, and the consequent less rapid hardening of the adhesive during vulcanization. This can be remedied by the inclusion of a small amount of an amine in the rubber stock, or in a cover cement interposed between the adhesive and the rubber stock.

*Example III.—Cover cement*

| | Parts |
|---|---|
| Conventional natural rubber tread stock formulation | 15 |
| 2,4 diamino-diphenyl amine | 0.2 |
| Odorless gasoline | 100 |

Natural rubber was adhered to steel using substantially the procedure of Example I and the cement of items Nos. 16-25 of Table I. The sole departure consisted in applying, over the adhesive layer and before assembly with the rubber, a cover cement of the ingredients listed immediately hereinabove. The adhesion on hot pull, at room temperature and after heat aging was 100% in all cases.

Similar results were obtained using other cover cements in which the 2,4 diamino-diphenyl amine was replaced by other amines such as phenyl - β - naphthylamine, phenyl - α - naphthylamine, N,N' diphenyl-p-phenylene diamine, N,N'-di-β-naphthyl-para-phenylene diamine and hexamethylene tetramine.

*Example IV.—Styrene copolymer*

| | Parts |
|---|---|
| "A" { Chlorinated rubber (chlorine 65%, viscosity 90 cps. in 20% toluene solution at 25° C.) | 10 |
| Styrene | 10 |
| Dichlorobutadiene | 30 |
| Para cresol | 0.3 |
| Toluene (chilled to 0° C.) | 20 |

The ingredients listed at "A" were heated together at 100° C. until vigorous polymerization set in, after which the mass was immediately chilled by addition of the toluene. The resultant cement was used to adhere the components of a steel-Buna S concentric ring motor mounting, the assembly being cured in a press at 130° C. for 40 minutes. The adhesion between the elastic and metallic components of the mounting withstood prolonged and severe vibratory loading.

Similar results were obtained with the use of other monomers in place of the styrene, including vinyl chloride, vinylidene chloride, acrylonitrile and others.

*Example V.—Replacement of chlorinated rubber*

Chlorinated polybutadiene (containing 56% chlorine, having a viscosity of 100 cps. in 20% toluene solution at 25° C.) or "Parlon X" (a chlorinated polyisoprene manufactured by the Hercules Powder Company)

Cements were prepared similar to those of Table I, items Nos. 4, 13, 16 and 30, with the exception that the chlorinated rubber was replaced by one or the other of the chlorinated synthetic products listed at the head of this example. Satisfactory results were obtained in every case. Slightly inferior hot-pull was noted in a few instances, but this difficulty was found remediable by the use of an amine-containing cover cement such as described in Example III.

*Example VI*

A

| | Parts |
|---|---|
| Chlorinated rubber (viscosity 125 cps. at 25° C. in 20% toluene solution, chlorine 64.8%) | 125 |
| Dichlorobutadiene | 500 |
| p-Cresol | 5 |
| Thiourea | 19 |

B

| | |
|---|---|
| Carbon black (non-reinforcing) | 3 |
| Toluene | 62 |
| Xylene | 50 |

The ingredients at "A" were dissolved together and heated on a water bath at 87° C. for 8½ minutes, the temperature rising from 24° to 61° C. during this time, and the mass was then cooled to 30° C. The ingredients at "B" had been ball-milled together for 6 hours, and this mixture was added to the cooled mass. The resultant cement was applied to a steel fuel cell sump fitting, and dried. Plies of a "modified" butadiene-acrylonitrile elastomer (an elastomer produced from 45% acrylonitrile and 55% butadiene, these components being copolymerized in the presence of "modifying" or "regulating" agents as described in the patent to Wollthan No. 2,281,613) were built around the fitting, and the assembly cured in a press for 25 minutes at 145° C. The cured assembly was built into a fuel cell of uncured elastomer composition, and the cell thus built was subjected to an open steam cure at 150° C. for 75 minutes. The assembly was then immersed in "813-J" aviation fuel, at 25° C. The strength of the adhesive bond after 240 hours' immersion was unimpaired, failure eventually occuring by disintegration of the stock.

Example VII

Two sheets of "Melmac Resin N-592" (a proprietary melamine resin manufactured by the American Cyanamid Company) were coated with the cements of Table II, items No. 32 and No. 16 respectively. The coated sheets were plied with a sheet of a butadiene-acrylonitrile copolymeric elastomer, and cured in a press at 140° C. for 25 minutes. Excellent adhesion was obtained in each case.

Example VIII

| | Parts |
|---|---|
| Vinyl chloride-Vinyl acetate copolymer resin ("Vinylite VYHH," a product of the Carbide and Carbon Chemicals Corp.) | 10 |
| Dichlorobutadiene monomer | 10 |
| Trichloroethylene | 60 |

The ingredients listed were dissolved together to form a cement. Strips of a butadiene-acrylonitrile elastomer were coated with the cement, and the strips were plied together and cured in a press at 150° C. for 25 minutes. A highly tenacious bond resulted.

Example IX

The cement of Table I, item No. 16 was used to adhere a conventional GR–S tire body stock to a white pigmented formulation of Lactoprene EV. The cement was coated and dried upon the GR–S stock, the Lactoprene EV plied upon the coated surface, and the assembly cured in a press at 140° C. for 25 minutes. Excellent adhesion was obtained. The pair of elastomers involved are quite difficult to adhere together by means of any adhesives hitherto proposed.

Example X

The adhesive of Table I, item No. 16 was used to adhere together the various metals listed in Example I in all possible combinations. In each case, the adhesive was coated and dried upon the metals, which were then assembled together and cured in a holding jig at 135° C. for 30 minutes. Excellent adhesion was secured in every case.

From the foregoing general discussion and detailed examples, it will be seen that this invention provides novel and strong adhesive bonding agents for elastomers, metals and other materials. Particularly as applied to the adhesion of elastomers to metals, the process of this invention may be carried out with less elaborate precautions, and with more reliable results, than processes heretofore practiced. The invention may, moreover, be practiced with the use of wholly domestically produced materials. The invention lends itself to operation in industrial plants by reason of its adaptability to a wide variety of materials, permitting plant-wide standardization of the adhesive formulations and procedure. The preferred cements have excellent strength even at high temperatures, permitting rough handling of objects newly ejected from vulcanizing presses and the like. The adhesives have been used successfully on a wide variety of practical elastomer-metal assemblies, such as motor mountings, muffler bushings, muffler supports, torsion bushings, vibration dampeners, railway draft gears, railway tie plates, casters, solid tire wheels and many other like assemblies.

What is claimed is:

1. A flowable adhesive composition comprising an organic solvent, a broken-down gel of a copolymer of the materials distilling from crude 2,3-dichlorobutadiene-1,3 over the range denoted by fractions 2, 3, 4, 5 and 6 in the graph of the drawing, together with chlorinated rubber, said broken-down gel having been formed by heating the composition to a temperature above 60° C. to dissolve the mass, and then cooling with vigorous agitation.

2. A flowable adhesive composition comprising toluene, a broken-down gel of a polymer of 2,3-dichlorobutadiene-1,3, and chlorinated polybutadiene, said broken-down gel having been formed by heating the composition to a temperature about 60° C. to dissolve the mass, and then cooling with vigorous agitation.

3. An adhered structure comprising a metallic substrate selected from the class of materials consisting of cast iron, wrought iron, ingot iron, steel, stainless steel, aluminum, duralumin, magnesium, copper, lead, Monel metal, nickel, zinc, galvanized metals, brass and bronze, an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, and an interposed adhesive layer comprising a substance selected from the group consisting of resinous homopolymers of 2,3-dichlorobutadiene-1,3, and resinous copolymers thereof with unsaturated compounds copolymerizable therewith and containing at least 60% of 2,3-dichlorobutadiene-1,3 copolymerized therein, and a bodying resin selected from the group consisting of (a) chlorinated (1) polychloroprene, (2) polyvinyl chloride and (3) polyvinylidene chloride and (b) chlorinated, hydrochlorinated and chlorinated-hydrochlorinated (1) rubber, (2) balata, (3) gutta percha, (4) Chilte gum, (5) polybutadiene, (6) synthetic polyisoprene and (7) butadiene-styrene copolymers.

4. An adhered structure comprising a steel substrate, an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, and an interposed adhesive layer comprising a substance selected from the group consisting of resinous homopolymers of 2,3-dichlorobutadiene-1,3 and resinous copolymers thereof with unsaturated compounds copolymerizable therewith and containing at least 60% of 2,3-dichlorobutadiene-1,3 copolymerized therein, together with chlorinated rubber.

5. An adhered structure comprising a steel substrate, an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, and an interposed adhesive layer comprising a substance selected from the group consisting of resinous homopolymers of 2,3-dichlorobutadiene-1,3 and resinous copolymers thereof with unsaturated compounds copolymerizable therewith and containing at least 60% of 2,3-dichlorobutadiene-1,3 copolymerized therein, together with chlorinated polybutadiene.

6. An adhered structure comprising a steel substrate, a natural rubber superstrate, and two interposed adhesive layers, the first of said layers being adjacent the substrate and comprising a copolymer of the fractions distilling from crude 2,3-dichlorobutadiene-1,3 over the range denoted as fractions 2, 3, 4, 5 and 6 in the graph of the drawing, and the second of said adhesive layers being intermediate the first layer and the superstrate and comprising an elastomeric stock containing an amine.

7. An adhered structure which comprises a steel substrate, a superstrate comprising an elastomeric copolymer of butadiene and styrene, and an interposed adhesive layer comprising a copolymer of the fractions distilling from crude 2,3-dichlorobutadiene-1,3 over the range denoted as fractions 2, 3, 4, 5 and 6 in the graph of the drawing, together with chlorinated rubber.

8. An adhered structure comprising a steel substrate, a superstrate comprising an elastomeric copolymer of butadiene and styrene, and an interposed adhesive layer comprising a polymer of 2,3-dichlorobutadiene-1,3, together with chlorinated polybutadiene.

9. Process which comprises superposing a metallic substrate selected from the class of materials consisting of cast iron, wrought iron, ingot iron, steel, stainless steel, aluminum, duralumin, magnesium, copper, lead, Monel metal, nickel, zinc, galvanized metals, brass and bronze and an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, with an interposed adhesive layer comprising a substance selected from the group consisting of resinous homopolymers of 2,3-dichlorobutadiene-1,3, and resinous copolymers thereof with unsaturated compounds copolymerizable therewith and containing at least 60% of 2,3-dichlorobutadiene-1,3 copolymerized therein, and a bodying resin selected from the group consisting of (a) chlorinated (1) polychloroprene, (2) polyvinyl chloride and (3) polyvinylidene chloride and (b) chlorinated, hydrochlorinated and chlorinated-hydrochlorinated (1) rubber, (2) balata, (3) gutta percha, (4) Chilte gum, (5) polybutadiene, (6) synthetic polyisoprene and (7) butadiene-styrene copolymers, and subjecting the assembly to heat-curing.

10. Process which comprises superposing a metallic substrate selected from the class of materials consisting of cast iron, wrought iron, ingot iron, steel, stainless steel, aluminum, duralumin, magnesium, copper, lead, Monel metal, nickel, zinc, galvanized metals, brass and bronze and an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, with an interposed adhesive layer comprising a substance selected from the group consisting of resinous homopolymers of 2,3-dichlorobutadiene-1,3, and resinous copolymers thereof with unsaturated compounds copolymerizable therewith and containing at least 60% of 2,3-dichlorobutadiene-1,3 copolymerized therein, together with chlorinated rubber, and subjecting the assembly to heat-curing.

11. Process which comprises superposing a metallic substrate selected from the class of materials consisting of cast iron, wrought iron, ingot iron, steel, stainless steel, aluminum, duralumin, magnesium, copper, lead, Monel metal, nickel, zinc, galvanized metals, brass and bronze and an elastomeric superstrate selected from the class of elastomeric materials consisting of natural rubber, butadiene-styrene copolymers, butadiene-acrylonitrile copolymers, polychloroprene, lactoprene, polyisoprene, butyl rubber and polybutadiene, with an interposed adhesive layer comprising a substance selected from the group consisting of resinous homopolymers of 2,3-dichlorobutadiene-1,3, and resinous copolymers thereof with unsaturated compounds copolymerizable therewith and containing at least 60% of 2,3-dichlorobutadiene-1,3 copolymerized therein, together with chlorinated polybutadiene, and subjecting the assembly to heat-curing.

12. Process which comprises superposing a steel substrate and a natural rubber superstrate, with an interposed adhesive layer comprising a copolymer of the fractions distilling from crude 2,3-dichlorobutadiene-1,3 over the range denoted as fractions 2, 3, 4, 5 and 6 in the graph of the drawing, together with chlorinated rubber, and subjecting the assembly to heat-curing.

13. Process which comprises superposing a steel substrate and a superstrate comprising an elastomeric copolymer of butadiene and styrene, with an interposed adhesive layer comprising a polymer of 2,3-dichlorobutadiene-1,3, together with chlorinated polybutadiene, and subjecting the assembly to heat-curing.

14. Process which comprises superposing a steel substrate and a superstrate comprising an elastomeric copolymer of butadiene and styrene, together with an interposed adhesive layer comprising a copolymer of the fractions distilling from crude 2,3-dichlorobutadiene-1,3 over the range denoted as fractions 2, 3, 4, 5 and 6 in the graph of the drawing, together with chlorinated rubber, and subjecting the assembly to heat-curing.

15. A flowable adhesive composition comprising an organic solvent, a broken-down gel of a substance selected from the group consisting of resinous homopolymers of 2,3-dichlorobutadiene-1,3 and copolymers thereof with other unsaturated compounds copolymerizable therewith and containing at least 60% of 2,3-dichlorobutadiene-1,3 copolymerized therein, and a bodying resin selected from the group consisting of (a) chlorinated (1) polychloroprene (2) polyvinyl chloride and (3) polyvinylidene chloride and (b) chlorinated, hydrochlorinated and chlorinated hydrochlorinated (1) rubber, (2) balata, (3) gutta percha, (4) Chilte gum, (5) polybutadiene (6) synthetic polyisoprene and (7) butadiene-styrene copolymers, said broken-down gel having been formed by heating the composition to a temperature above 60° C. to dissolve the mass, and then cooling with vigorous agitation.

LEROY B. KUHN.

REFERENCES CITED

The following references are of record in the file of this patent:

UNITED STATES PATENTS

| Number | Name | Date |
|---|---|---|
| 1,965,369 | Carothers et al. | July 3, 1934 |
| 2,227,517 | Starkweather et al. | Jan. 7, 1941 |
| 2,395,071 | Sarbach | Feb. 19, 1946 |

FOREIGN PATENTS

| Number | Country | Date |
|---|---|---|
| 418,469 | Great Britain | Oct. 25, 1934 |
| 662,281 | Germany | July 3, 1938 |